US012779715B2

(12) United States Patent
Yang et al.

(10) Patent No.: US 12,779,715 B2
(45) Date of Patent: Nov. 3, 2026

(54) RAZOR CARTRIDGE

(71) Applicant: DORCO CO., LTD., Seoul (KR)

(72) Inventors: Ji Hoon Yang, Seoul (KR); Se Jun Jang, Seoul (KR)

(73) Assignee: Dorco Co., Ltd., Seoul (KR)

( * ) Notice: Subject to any disclaimer, the term of this patent is extended or adjusted under 35 U.S.C. 154(b) by 26 days.

(21) Appl. No.: 18/659,848

(22) Filed: May 9, 2024

(65) Prior Publication Data

US 2024/0286304 A1 Aug. 29, 2024

Related U.S. Application Data

(63) Continuation of application No. PCT/KR2023/018414, filed on Nov. 16, 2023.

(30) Foreign Application Priority Data

Nov. 18, 2022 (KR) ........................ 10-2022-0155480
Nov. 3, 2023 (KR) ........................ 10-2023-0150931

(51) Int. Cl.
*B26B 21/22* (2006.01)
*B26B 21/40* (2006.01)
*B26B 21/44* (2006.01)

(52) U.S. Cl.
CPC ........ *B26B 21/222* (2013.01); *B26B 21/4018* (2013.01); *B26B 21/4031* (2013.01); *B26B 21/443* (2013.01)

(58) Field of Classification Search
CPC .............. B26B 21/222; B26B 21/4018; B26B 21/4031; B26B 21/443; B26B 21/20;
(Continued)

(56) References Cited

U.S. PATENT DOCUMENTS 4,407,067 A * 10/1983 Trotta .................. B26B 21/222 30/50
6,212,777 B1 * 4/2001 Gilder ................. B26B 21/4031 30/50
(Continued)

FOREIGN PATENT DOCUMENTS

EP 1729936 B1 11/2009
EP 3453500 A1 * 3/2019 ............. B26B 21/52
(Continued)

OTHER PUBLICATIONS

EP_3453500_A1 (Year: 2019).*
(Continued)

*Primary Examiner* — Jonathan G Riley
(74) *Attorney, Agent, or Firm* — Knobbe, Martens, Olson & Bear, LLP

(57) ABSTRACT

A razor cartridge is proposed. The razor cartridge may include at least one blade, a blade housing accommodating the at least one blade, and a guard frame accommodating the blade housing to be movable forwards and backwards. The guard frame may include a first front supporter provided in front of the blade housing. The blade housing may include a second front supporter provided between the blade and the first front supporter. A topmost portion of the first front supporter may be higher than a topmost portion of the second front supporter so that the first front supporter can come into contact with skin where the blade housing is at a foremost position relative to the guard frame, and the second front supporter can come into contact with skin where the blade housing is at a rearmost position relative to the guard frame, during shaving the shaving process.

21 Claims, 10 Drawing Sheets

(58) Field of Classification Search
CPC ..... B26B 21/40; B26B 21/4012; B26B 21/44; B26B 21/38; B26B 21/526
See application file for complete search history.

(56) References Cited

U.S. PATENT DOCUMENTS

| | | | | |
|---|---|---|---|---|
| 10,967,531 | B2 * | 4/2021 | Griffin | B26B 21/4012 |
| 11,000,960 | B1 * | 5/2021 | Hooberman | B26B 21/4031 |
| 11,220,014 | B2 * | 1/2022 | Kim | B26B 21/56 |
| 12,515,363 | B2 | 1/2026 | Ahn et al. | |
| 2003/0204955 | A1 * | 11/2003 | Gilder | B26B 21/4031 30/32 |
| 2005/0198830 | A1 | 9/2005 | Walker et al. | |
| 2005/0278954 | A1 * | 12/2005 | Orloff | B26B 21/44 30/32 |
| 2012/0110857 | A1 * | 5/2012 | Peterson | B26B 21/4031 30/50 |
| 2014/0026424 | A1 * | 1/2014 | Oglesby | B26B 21/4031 30/50 |
| 2016/0158948 | A1 * | 6/2016 | Eagleton | B26B 21/4018 30/34.2 |
| 2017/0203451 | A1 * | 7/2017 | Griffin | B26B 21/565 |
| 2017/0217033 | A1 * | 8/2017 | Tucker | B26B 21/4031 |
| 2017/0266825 | A1 * | 9/2017 | Bozikis | B26B 21/4031 |
| 2018/0304483 | A1 * | 10/2018 | Lev | B26B 21/4012 |
| 2019/0270210 | A1 | 9/2019 | Coresh | |
| 2020/0346357 | A1 | 11/2020 | Skodras et al. | |
| 2022/0314477 | A1 | 10/2022 | Galanis et al. | |
| 2023/0166417 | A1 | 6/2023 | Lee et al. | |
| 2023/0166420 | A1 | 6/2023 | Ahn et al. | |
| 2023/0390953 | A1 | 12/2023 | Kim | |
| 2024/0286303 | A1 | 8/2024 | Yang et al. | |

FOREIGN PATENT DOCUMENTS

| | | | | | |
|---|---|---|---|---|---|
| JP | 2007083084 | A | * | 4/2007 | B26B 21/227 |
| JP | 2009189589 | A | * | 8/2009 | |
| KR | 10-2006-0121161 | A1 | | 11/2006 | |
| KR | 101068271 | B1 | * | 9/2011 | B26B 21/38 |
| KR | 10-1774370 | B1 | | 9/2017 | |
| KR | 10-2028912 | B1 | | 10/2019 | |
| KR | 10-2063770 | B1 | | 1/2020 | |
| KR | 10-2192994 | B1 | | 12/2020 | |

OTHER PUBLICATIONS

JP_2007083084_A_(Year: 2007).*
JP_2009189589_A (Year: 2009).*
KR_101068271_B1_ (Year: 2011).*
International Search Report mailed Feb. 20, 2024 in International Application No. PCT/KR2023/018414.
International Search Report mailed Feb. 16, 2024 in International Application No. PCT/KR2023/018415.
Office Action received in Korean Application No. 10-2023-0150932 dated Oct. 2, 2025.
Office Action in corresponding Korean Application No. 10-2023-0150931 dated Oct. 2, 2025.
Notice of Allowance in U.S. Appl. No. 18/659,824 dated Feb. 24, 2026.
Notice of Allowance in KR Application No. 10-2023-0150932 dated Feb. 13, 2026.

* cited by examiner

20

20

RAZOR CARTRIDGE

CROSS-REFERENCE TO RELATED APPLICATIONS

This is a continuation application of International Application No. PCT/KR2023/018414 filed on Nov. 16, 2023, which claim the priority benefit of Korean Patent Application Nos. 10-2022-0155480, filed on Nov. 18, 2022 and 10-2023-0150931, filed on Nov. 3, 2023 in the Korean Intellectual Property Office, the disclosure of each of which is incorporated herein by reference in its entirety.

BACKGROUND

Technical Field

The disclosure relates to a razor cartridge, and more particularly to a razor cartridge in which at least one blade is accommodated.

Description of Related Technology

In general, a razor refers to a device that is used to cut body hair such as fine hair and beard from a face or body, and includes a razor handle for gripping, and a razor cartridge with a blade for shaving while being in contact with skin.

SUMMARY

One aspect is a razor cartridge capable of linear motion, which has an improved shaving efficiency while causing less irritation to skin.

The aspects of the disclosure are not limited to the aspects disclosed herein, and other aspects not mentioned here may become apparent to those skilled in the art from the following description.

Another aspect is a razor that includes at least one blade having a cutting edge; a blade housing accommodating the at least one blade in a longitudinal direction; and a guard frame accommodating the blade housing to be movable forwards and backwards, in which the guard frame includes a first front supporter provided in front of the blade housing and coming into contact with skin during a shaving process, the blade housing includes a second front supporter provided between the blade and the first front supporter and coming into contact with skin during the shaving process, and a topmost portion of the first front supporter is higher than a topmost portion of the second front supporter so that the first front supporter can come into contact with skin in a state that the blade housing is at a foremost position relative to the guard frame, and the second front supporter can come into contact with skin in a state that the blade housing is at a rearmost position relative to the guard frame, during shaving the shaving process.

Other details of the disclosure are included in the detailed description and the accompanying drawings.

According to the embodiments of the disclosure, the effects are at least as follows.

A shaving efficiency is improved while causing less irritation to skin.

The effects of the disclosure are not limited to those described above, and various other effects are included in the following description.

DETAILED DESCRIPTION

Figure 1:
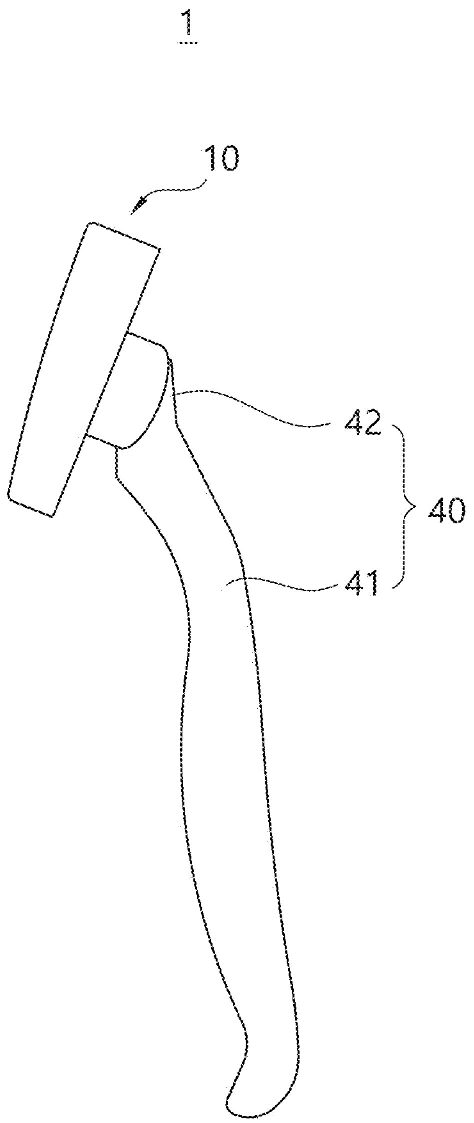
FIG. 1 is a lateral view schematically illustrating a razor assembly according to an embodiment of the disclosure.

Recently, razor technology that makes the razor cartridge move in linear motion in a shaving direction has emerged as a method of improving a hair cutting efficiency of the blade.

In such a razor, the blade is structured to alternate between forward movement in the shaving direction and backward movement in an opposite direction to the shaving direction, and the forward movement of the blade causes strong irritation to a user's skin.

The merits and characteristics of the disclosure and a method for achieving the merits and characteristics will become more apparent from embodiments described below in detail in conjunction with the accompanying drawings. However, the disclosure is not limited to the disclosed embodiments, but may be implemented in various different ways. The embodiments are provided to only complete the disclosure and to allow those skilled in the art to understand the category of the disclosure. The disclosure is defined by the category of the claims.

In addition, embodiments of the disclosure will be described with reference to cross-sectional views and/or schematic views as idealized exemplary illustrations. Therefore, the illustrations may be varied in shape depending on manufacturing techniques, tolerance, and/or etc. Further, elements in the drawings may be relatively enlarged or reduced for convenience of description. Like numerals refer to like elements throughout.

Further, first, second, i), ii), a), b) and the like terms may be used in describing elements according to embodiments of the disclosure. Such terms are used solely for the purpose of differentiating one element from another, but not limit the substances, the order, sequence, etc. of those elements. Throughout this specification, when a part 'includes' or 'comprises' an element, the part is meant to further include other elements rather than excluding other elements unless otherwise stated explicitly.

Below, a razor cartridge and a razor assembly including the same according to embodiment of the disclosure will be described with reference to the accompanying drawings.

FIG. 1 is a lateral view schematically illustrating a razor assembly according to an embodiment of the disclosure.

Referring to FIG. 1, a razor assembly 1 according to an embodiment of the disclosure includes a razor cartridge 10, and a handle 40 to which the razor cartridge 10 is coupled. According to an embodiment, the razor cartridge 10 may be detachably coupled to the razor handle 40. Further, the razor cartridge 10 according to an embodiment may be rotatable within a specific angle range with respect to the razor handle 40. Alternatively, the razor cartridge 10 according to an embodiment may be not rotatable with respect to the razor handle 40.

The razor handle 40 includes a handle body 41 and a handle head 42.

The handle body 41 refers to a part to be gripped by a user.

The handle head 42 is provided at a first end of the handle body 41, allows the razor cartridge 10 to be detachably coupled thereto, and rotatably supports the coupled razor cartridge 10. To this end, a connecting member (not shown) for connecting the razor cartridge 10 and the razor handle 40 may be provided between the razor cartridge 10 and the end of the handle head 42. The connecting member may allow the razor cartridge 10 to be detachably coupled to the razor handle 40, or may allow the razor cartridge 10 to be rotatably coupled to the razor handle 40. However, the connecting member may not provide, but not limited to, at least one of functions such as the detachable coupling and the rotatable coupling between the razor cartridge 10 and the razor handle 40.

Below, a razor cartridge according to an embodiment of the disclosure will be described.

Figure 2:
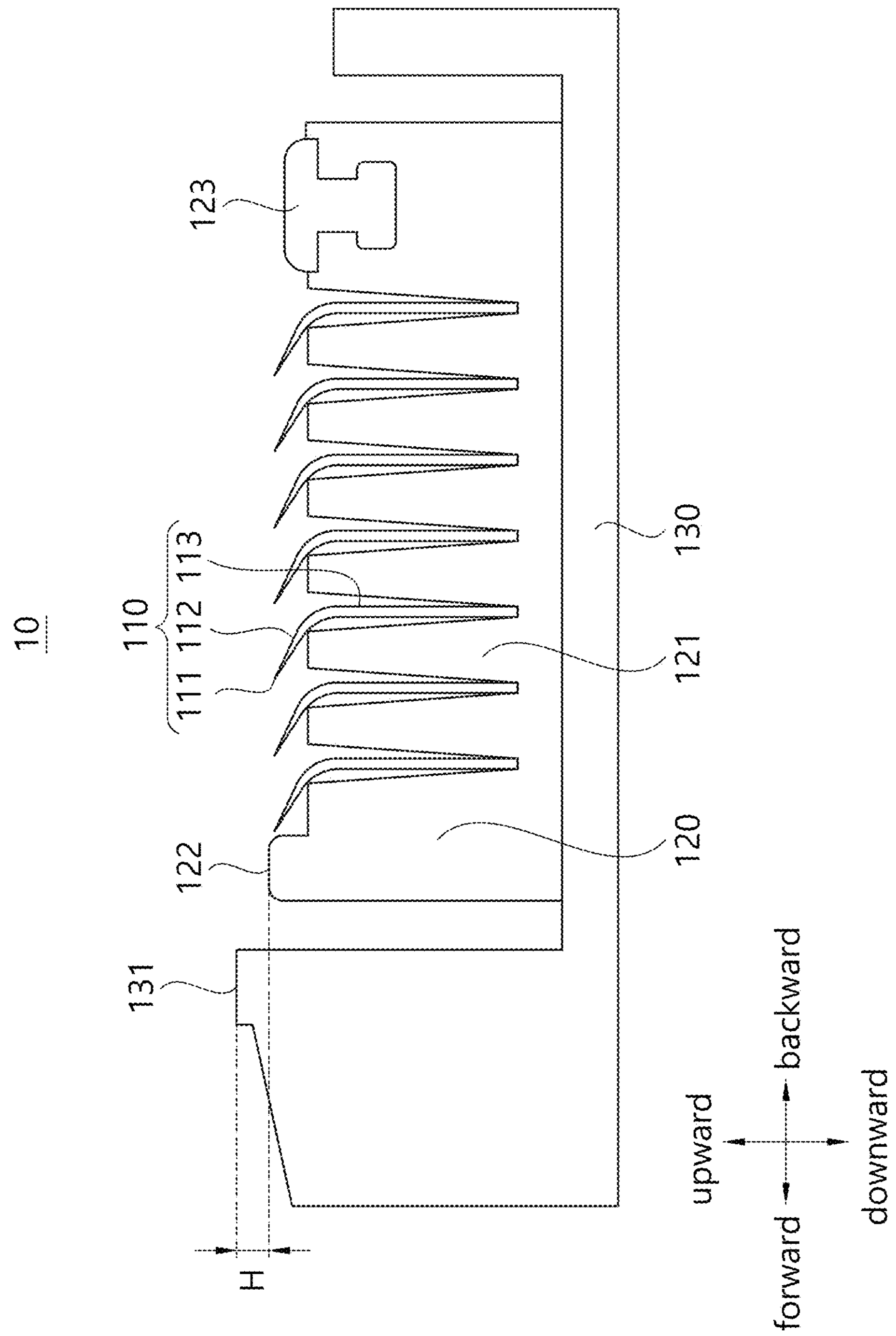
FIG. 2 is a lateral view schematically illustrating a razor cartridge according to an embodiment of the disclosure.

FIG. 2 is a lateral view schematically illustrating a razor cartridge according to an embodiment of the disclosure.

Referring to FIG. 2, the razor cartridge 10 according to an embodiment of the disclosure includes at least one blade 110, a blade housing 120, and a guard frame 130.

The blade 110 includes a cutting edge 111 for cutting body hair. The blade 110 may include at least one of a straight blade, a bending blade, and a welded blade. The bending blade is illustrated as the blade 110 in FIG. 2, etc.

The blade housing 120 is structured to accommodate at least one blade 110 in a longitudinal direction. The blades 110 may be accommodated in the blade housing 120 in a transverse direction so that the cutting edges 111 are parallel along the longitudinal direction. Referring to FIG. 2, the transverse direction corresponds to forward and backward directions.

Further, the forward direction in FIG. 2 may refer to a direction (i.e., a shaving direction) where the razor cartridge 10 moves on a user's skin during a shaving process.

Further, the top surface of the razor cartridge 10 (to be described later) refers to a surface that touches or faces a user's skin during the shaving process.

In the blade housing 120, each blade 110 may be accommodated with its cutting edge 111 facing forwards. FIG. 2, etc. show an example that seven blades 110 are accommodated in the blade housing 120, but the number of blades 110 may be varied depending on embodiments.

Below, for convenience of description, it will be described by way of example that the seven blades 110 are included, and the seven blades 110 will be called a first blade, a second blade, a third blade, a fourth blade, a fifth blade, a sixth blade, and a seventh blade in order from the foremost blade to the rearmost blade. In other words, the foremost blade of the seven blades is the first blade, and the rearmost blade is the seventh blade.

Referring to FIG. 2, the blade housing 120 includes a blade supporting end 121 to accommodate and support each blade 110. The blade supporting end 121 protrudes upwards and supports one side of the blade 110, e.g., a lower portion of an edge portion 112. A pair of neighboring blade supporting ends 121 is formed with a space therebetween to accommodate a base portion 113 of the blade 110.

The blade housing 120 includes a second front supporter 122 positioned in front of the cutting edge of the first blade. The top surface of the second front supporter 122 may be positioned above the blade supporting end 121 supporting the first blade.

The second front supporter 122 may protect a user from getting a cut on skin by pressing the skin in front of the first blade during the shaving process, and enhance the hair cutting effect of the first blade by pulling hair right in front of the first blade.

Further, the second front supporter 122 may be formed with a comb for aligning body hair.

The blade housing 120 may include a lubrication band 123 provided behind the rearmost blade (i.e., the seventh blade in FIG. 2). The lubrication band 123 may be at least partially exposed to the top of the blade housing 120. The lubrication band 123 includes a lubricating material, and applies the lubricating material to a skin surface where the blade 110 has passed during the shaving process. The lubricating material may contain an ingredient for protecting skin after shaving and/or an ingredient for smoothing shaving strokes.

The blade housing 120 includes a rear supporter provided in back of the rearmost blade (i.e., the seventh blade in FIG. 2) and touching skin during the shaving process. In the embodiment shown in FIG. 2, the lubrication band 123 may be used as the rear supporter. According to another embodiment, the rear supporter may be provided behind the lubrication band 123 or between the lubrication band 123 and the rearmost blade and protruding upwards higher than the lubrication band 123. Alternatively, the blade housing 120 may include not the lubrication band 123 but the rear supporter provided behind the rearmost blade. For example, the lubrication band 123 may be provided in the guard frame 130. For convenience of description, it will be described below by way of example that the lubrication band 123 functions as the rear supporter, but the disclosure is not limited thereto. The rear supporter and the lubrication band may be provided as separate elements.

The guard frame 130 accommodates the blade housing 120 to be movable forwards and backwards. The guard frame 130 allows the blade housing 120 to slide forwards and backwards within a specific distance range while preventing the blade housing 120 from being separated. The direction in which the blade housing 120 slides forwards and backwards may be parallel to the shaving direction.

The blade housing 120 may reciprocate within the guard frame 130 by power transmitted from a separate power source (for example, a motor (not shown) provided in the razor handle 40). For example, the motor provided in the razor handle 40 may generate a rotational force, and at least one of the razor handle 40 and the razor cartridge 10 may include a power conversion mechanism (e.g., a cam, a crank, a link, etc.) that converts the rotational force of the motor into linear reciprocating motion so that the blade housing 120 can have the linear reciprocating motion. Alternatively, the blade housing 120 may be connected to a power source for linear reciprocating motion, and thus have the linear reciprocating motion within the guard frame 130. Alternatively, the blade housing 120 may have the linear reciprocating motion by a mechanical method of using a power conversion mechanism (e.g., a cam, a crank, a link, etc.) that converts a force exerted by a user's operation or shaving stroke into the linear reciprocating motion without using an electrically operating power source.

The guard frame 130 includes a first front supporter 131 positioned in front of the blade housing 120. The first front supporter 131 may protrude upwards higher than the cutting edge of the first blade.

Referring to FIG. 2, the topmost portion of the first front supporter 131 may be lower than the topmost portion of the second front supporter 122. The first front supporter 131 may protrude upwards higher than the cutting edge of the first blade.

A height difference H between the topmost portion of the first front supporter 131 and the topmost portion of the second front supporter 122 may be within a range of 10 μm to 500 μm, 30 μm to 350 μm, or 50 μm to 250 μm.

A guard (not shown) may be formed on the top surface of the first front supporter 131. The guard comes into contact with a user's skin during a shaving process and pulls the skin, thereby improving the shaving effect of the blade 110. To more effectively pull the user's skin, the guard may have an embossed or engraved pattern on an upper surface thereof, and the upper surface of the guard may be made of rubber, silicone, or the like material.

Alternatively, a comb for aligning body hair may be formed on the top of the first front supporter 131.

Figure 3:
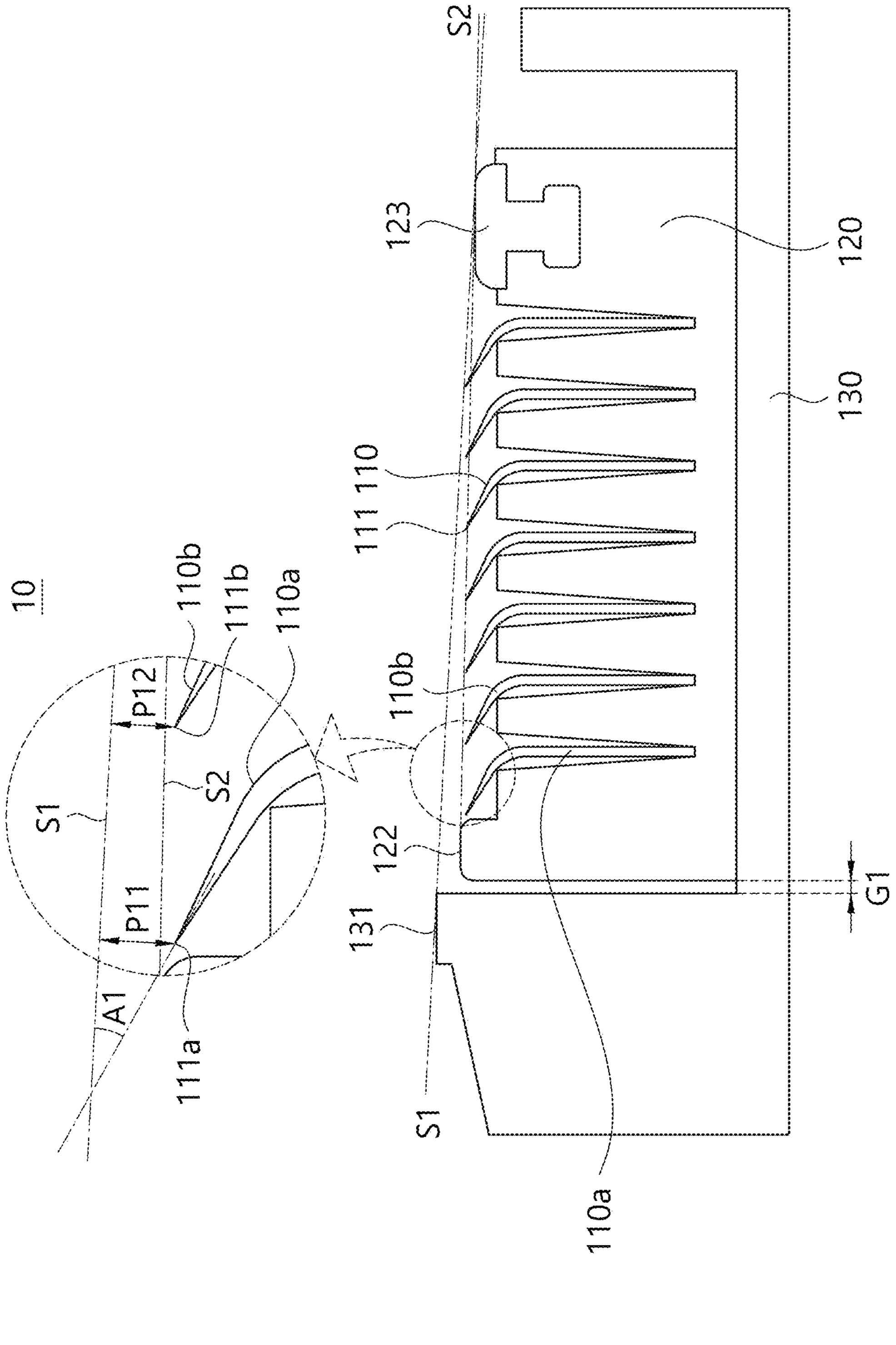
FIG. 3 is a lateral view schematically illustrating that a blade housing of a razor cartridge according to an embodiment of the disclosure is at a foremost position.

FIG. 3 is a lateral view schematically illustrating that a blade housing of a razor cartridge according to an embodiment of the disclosure is at a foremost position. When the blade housing 120 is at the foremost position, it means that the blade housing 120 is foremost within the range of linear reciprocating motion.

Referring to FIG. 3, in the state that the blade housing 120 is at the foremost position relative to the guard frame 130, a shaving plane may be defined as a first contact plane S1 that is tangent to both the first front supporter 131 and the rear supporter 123. In other words, in the state that the blade housing 120 is at the foremost position relative to the guard frame 130, the surface of skin to be shaved approximately corresponds to the first contact plane S1.

In the razor cartridge 10 according to an embodiment, the blade housing 120 performs shaving while alternating between forward movement and backward movement based on a motor or mechanical force. The shaving is performed by the blade 110 while the blade housing 120 is moving forwards. Because the blade 110 moves in the same direction as the shaving direction while the blade housing 120 is moving forwards, the forward movement of the blade housing 120 may cause strong irritation to skin. Further, such skin irritation is generally caused by the first and second blades which are at forward positions.

However, in the razor cartridge 10 according to an embodiment, the first front supporter 131 is positioned higher than the second front supporter 122, and thus the shaving plane is defined as the first contact plane S1 that connects the first front supporter 131 and the rear supporter 123 in the state that the blade housing is at the foremost position.

Protrusion values of the cutting edges 111 of all the blades 110 including the first and second blades with respect to the first contact plane S1 are smaller than those with respect to a second contact plane S2 connecting the second front supporter 122 and the rear supporter 123. As will be described later, the second contact plane S2 defines the shaving plane in the state that the blade housing 120 is at the rearmost position.

Therefore, skin irritation caused by the blades 110 while the blade housing 120 moves forwards is reduced.

In the state that the blade housing 120 is at the foremost position, the cutting edges 111 of all the blades 110 may be arranged to have a negative protrusion value with respect to the first contact plane S1. In other words, when the blade housing 120 is foremost, the cutting edges 111 of all the blades 110 may be positioned lower than the first contact plane S1.

When the blade housing 120 is at the foremost position, the cutting edge of the first blade may have a protrusion value ranging from −0.21 mm to −0.08 mm, from −0.207 mm to −0.089 mm, from −0.192 mm to −0.104 mm, or from −0.178 mm to −0.118 mm with respect to the first contact plane S1.

In the state that the blade housing 120 is at the foremost position, the protrusion value of the cutting edge of the second blade with respect to the first contact plane S1 may be greater than that of the cutting edge of the first blade with respect to the first contact plane S1. In other words, when the blade housing 120 is foremost, the cutting edge of the second blade may be positioned higher than the cutting edge of the first blade with respect to the first contact plane S1.

In the state that the blade housing 120 is at the foremost position, the cutting edge of the second blade may have a protrusion value ranging from −0.18 mm to −0.07 mm, from −0.172 mm to −0.074 mm, from −0.16 mm to −0.086 mm, or from −0.148 mm to −0.098 mm with respect to the first contact plane S1.

In the state that the blade housing 120 is at the foremost position, the shaving angle of the cutting edge of the first blade with respect to the first contact plane S1 (i.e., an angle between a line bisecting both sides of the blade forming the cutting edge and the first contact plane S1) may be within a range from 12.2 degrees to 29 degrees, from 12.24 degrees to 28.56 degrees, from 14.28 degrees to 26.52 degrees, or from 16.32 degrees to 24.48 degrees.

In the state that the blade housing 120 is at the foremost position, the shaving angle of the cutting edge of the second blade with respect to the first contact plane S1 may also be within a range from 12.2 degrees to 29 degrees, from 12.24 degrees to 28.56 degrees, from 14.28 degrees to 26.52 degrees, or from 16.32 degrees to 24.48 degrees.

As the blade housing 120 according to an embodiment moves forwards, the first contact plane S1 is defined as the shaving plane, and the cutting edge 111 of the blade 110 has a smaller shaving angle and a smaller protrusion value as compared with that of when the blade housing 120 is positioned in a rear area and the second contact plane S2 is defined as the shaving plane, thereby reducing a skin irritation caused by shaving and improving a shaving efficiency.

Meanwhile, in the state that the blade housing 120 is at the foremost position, the first front supporter 131 and the second front supporter 122 may be spaced apart by a specific distance or more. In the state that the blade housing 120 is at the foremost position, a gap G1 between the first front supporter 131 and the second front supporter 122 may be within a range from 0.8 mm to 2.0 mm, from 0.85 mm to 1.98 mm, from 0.99 mm to 1.84 mm, or from 1.13 mm to 1.7 mm. To make the shaving plane be defined as the first contact plane S1 in the state that the blade housing 120 is at the foremost position, a distance between the first front supporter 131 and the second front supporter 122 may be required to be shorter than a predetermined distance at the foremost position of the blade housing 120. Within the foregoing numerical range, the shaving plane based on the first contact plane S1 may be smoothly defined.

Figure 4:
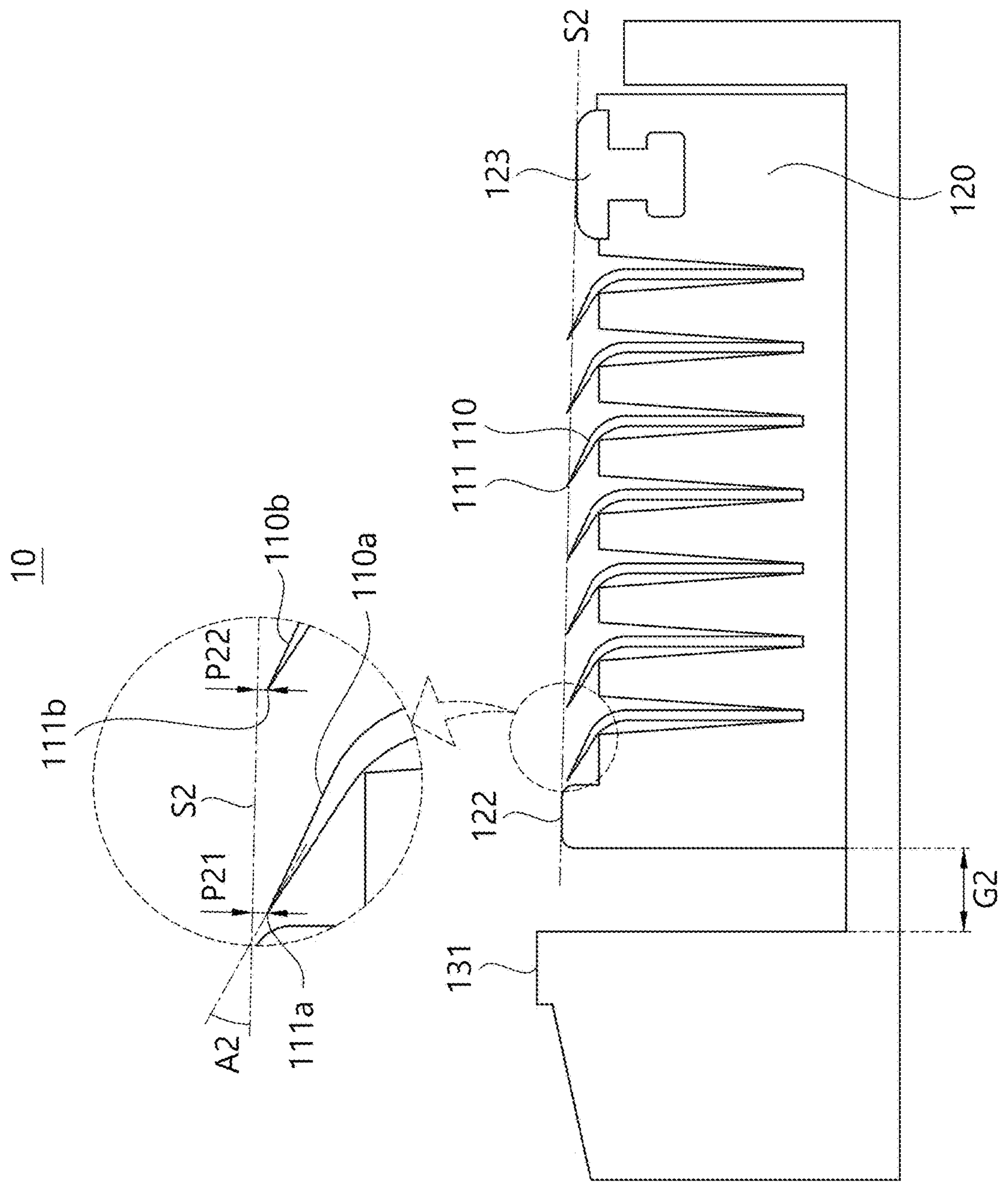
FIG. 4 is a lateral view schematically illustrating that a blade housing of a razor cartridge according to an embodiment of the disclosure is at a rearmost position.

FIG. 4 is a lateral view schematically illustrating that a blade housing of a razor cartridge according to an embodiment of the disclosure is at a rearmost position. When the blade housing 120 is at the rearmost position, it means that the blade housing 120 is rearmost within the range of linear reciprocating motion.

Referring to FIG. 4, in the state that the blade housing 120 is at the rearmost position relative to the guard frame 130, the first front supporter 131 and the second front supporter 122 are so considerably spaced apart from each other that the shaving plane can be defined as the second contact plane S2 that is tangent to both the second front supporter 122 and the rear supporter 123. In other words, in the state that the blade housing 120 is at the rearmost position relative to the guard frame 130, the surface of skin to be shaved approximately corresponds to the second contact plane S2.

The blades in a fore area (for example, the first blade, and the second blade) among the blades 110 may be disposed to have negative protrusion values with respect to the second contact plane S2, the blades in a rear area (for example, the sixth blade, and the seventh blade) may be disposed to have positive protrusion values with respect to the second contact plane S2, and at least one of the blades in a central area (for example, the third blade, the fourth blade, and the fifth blade) may be disposed to have a protrusion value of '0' with respect to the second contact plane S2. Further, the blades disposed in the rear area may have a greater protrusion value with respect to the second contact plane S2 than the blades disposed in the front area.

For example, with respect to the second contact plane S2, the first blade may be disposed so that the cutting edge can have a protrusion value of −0.04 mm, the second blade may be disposed so that the cutting edge can have a protrusion value of −0.03 mm, the third blade may be disposed so that the cutting edge can have a protrusion value of −0.01 mm, the fourth blade may be disposed so that the cutting edge can have a protrusion value of 0.00 mm, the fifth blade may be disposed so that the cutting edge can have a protrusion value of 0.01 mm, the sixth blade may be disposed so that the cutting edge can have a protrusion value of 0.03 mm, and the seventh blade may be disposed so that the cutting edge can have a protrusion value of 0.04 mm.

The second contact plane S2 may be positioned below the first contact plane S1 in front of the rear supporter 123, and may be positioned above the first contact plane S1 in back of the rear supporter 123 (see FIG. 3).

An angle between the first contact plane S1 and the second contact plane S2 may range from 0.2 degrees to 1.5 degrees, from 0.26 degrees to 1.5 degrees, from 0.3 degrees to 1.05 degrees, or from 0.38 degrees to 0.98 degrees.

The blade 110 moves in an opposite direction to the shaving direction while the blade housing 120 moves backwards. Therefore, the shaving efficiency of the blade 110 is lowered while the blade housing 120 moves backwards. However, according to an embodiment, the second contact plane S2 is defined as the shaving plane when the blade housing 120 moves backwards beyond a predetermined distance. Because the protrusion value of the cutting edge 111 of the blade 110 with respect to the second contact plane S2 is greater than the protrusion value of the cutting edge 111 of the blade 110 with respect to the first contact plane S1, the decrease in the shaving efficiency, which may be caused by the backward movement of the blade housing 120, is offset.

When the blade housing 120 is at the rearmost position, the cutting edge of the first blade may have a protrusion value ranging from −0.06 mm to −0.02 mm, from −0.053 mm to −0.023 mm, from −0.05 mm to −0.027 mm, or from −0.031 mm to −0.046 mm with respect to the second contact plane S2.

Difference between the protrusion value of the cutting edge of the first blade with respect to the first contact plane S1 in the state that the blade housing 120 is at the foremost position and the protrusion value of the cutting edge of the first blade with respect to the second contact plane S2 in the state that the blade housing 120 is at the rearmost position may be within a range from −154 μm to −66 μm, from −143 μm to −77 μm, or from −132 μm to −88 μm.

In the state that the blade housing 120 is at the rearmost position, the protrusion value of the cutting edge of the second blade with respect to the second contact plane S2 may be greater than that of the cutting edge of the first blade with respect to the second contact plane S2. In other words, when the blade housing 120 is rearmost, the cutting edge of the second blade may be positioned higher than the cutting edge of the first blade with respect to the second contact plane S2.

In the state that the blade housing 120 is at the rearmost position, the cutting edge of the second blade may have a protrusion value ranging from −0.04 mm to −0.015 mm, from −0.037 mm to −0.016 mm, from −0.035 mm to −0.019 mm, or from −0.032 mm to −0.021 mm with respect to the second contact plane S2.

Difference between the protrusion value of the cutting edge of the second blade with respect to the first contact plane S1 in the state that the blade housing 120 is at the foremost position and the protrusion value of the cutting edge of the second blade with respect to the second contact plane S2 in the state that the blade housing 120 is at the rearmost position may be within a range from −135 μm to −58 μm, from −125 μm to −67 μm, or from −116 μm to −77 μm.

Difference between the protrusion value of the cutting edge of the first blade with respect to the first contact plane S1 in the state that the blade housing 120 is at the foremost position and the protrusion value of the cutting edge of the first blade with respect to the second contact plane S2 in the state that the blade housing 120 is at the rearmost position may be greater than difference between the protrusion value of the cutting edge of the second blade with respect to the first contact plane S1 in the state that the blade housing 120 is at the foremost position and the protrusion value of the cutting edge of the second blade with respect to the second contact plane S2 in the state that the blade housing 120 is at the rearmost position.

The difference in the protrusion value of the cutting edge between the first blade and the second blade with respect to the first contact plane S1 in the state that the blade housing 120 is at the foremost position may be greater than the difference in the protrusion value of the cutting edge between the first blade and the second blade with respect to the second contact plane S2 in the state that the blade housing 120 is at the foremost position.

In the state that the blade housing 120 is at the rearmost position, the shaving angle of the cutting edge of the first blade with respect to the second contact plane S2 may be within a range from 12.6 degrees to 30 degrees, from 12.69 degrees to 29.61 degrees, from 14.81 degrees to 27.5 degrees, or from 16.92 degrees to 25.38 degrees.

In the state that the blade housing 120 is at the rearmost position, the shaving angle of the cutting edge of the second blade with respect to the second contact plane S2 may also be within a range from 12.6 degrees to 30 degrees, from 12.69 degrees to 29.61 degrees, from 14.81 degrees to 27.5 degrees, or from 16.92 degrees to 25.38 degrees.

The shaving angle of the cutting edge 111 of the blade 110 with respect to the second contact plane S2 in the state that the blade housing 120 is at the rearmost position may be larger than the shaving angle of the cutting edge 111 of the blade 110 with respect to the first contact plane S1 in the state that the blade housing 120 is at the foremost position.

Difference between the shaving angle of the cutting edge 111 of the blade 110 with respect to the first contact plane S1 in the state that the blade housing 120 is at the foremost position and the shaving angle of the cutting edge 111 of the blade 110 with respect to the second contact plane S2 in the state that the blade housing 120 is at the rearmost position may be within a range from −1.05 degrees to −0.45 degrees, from −0.98 degrees to −0.53 degrees, or from −0.9 degrees to −0.6 degrees.

As the blade housing 120 according to an embodiment moves backwards, the second contact plane S2 is defined as the shaving plane, and the cutting edge 111 of the blade 110 has a larger shaving angle and a greater protrusion value, so that the decrease in the shaving efficiency, which may be caused by the backward movement of the blade housing 120, can be offset.

Meanwhile, in the state that the blade housing 120 is at the rearmost position, a gap G2 between the first front supporter 131 and the second front supporter 122 may be within a range from 1.3 mm to 3.1 mm, from 1.33 mm to 3.09 mm, or from 1.55 mm to 2.87 mm, or from 1.77 mm to 2.65 mm. To make the shaving plane be defined as the second contact plane S2 in the state that the blade housing 120 is at the rearmost position, a distance between the first front supporter 131 and the second front supporter 122 may be required to be longer than a predetermined distance at the rearmost position of the blade housing 120. Within the foregoing numerical range, the shaving plane based on the second contact plane S2 may be smoothly defined.

Below, a razor cartridge according to another embodiment will be described. For convenience of description, elements like those of the foregoing embodiment are indicated by like numerals, and repetitive descriptions thereof will be avoided.

Figure 5:
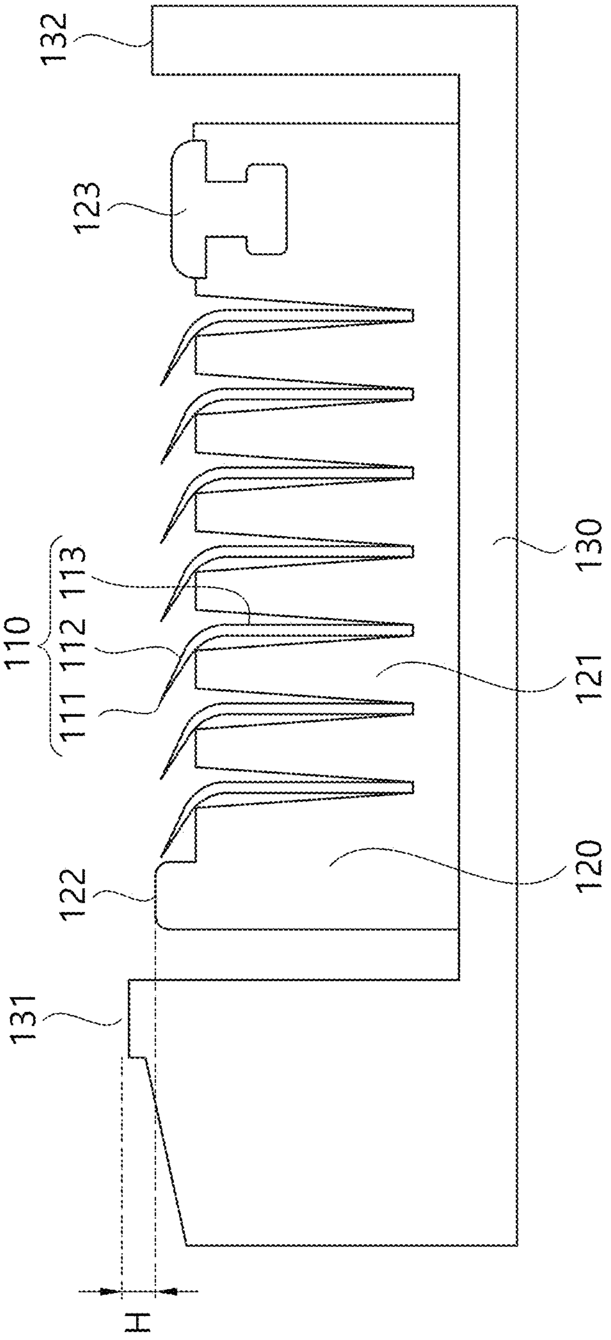
FIG. 5 is a lateral view schematically illustrating a razor cartridge according to another embodiment of the disclosure.
Figure 6:
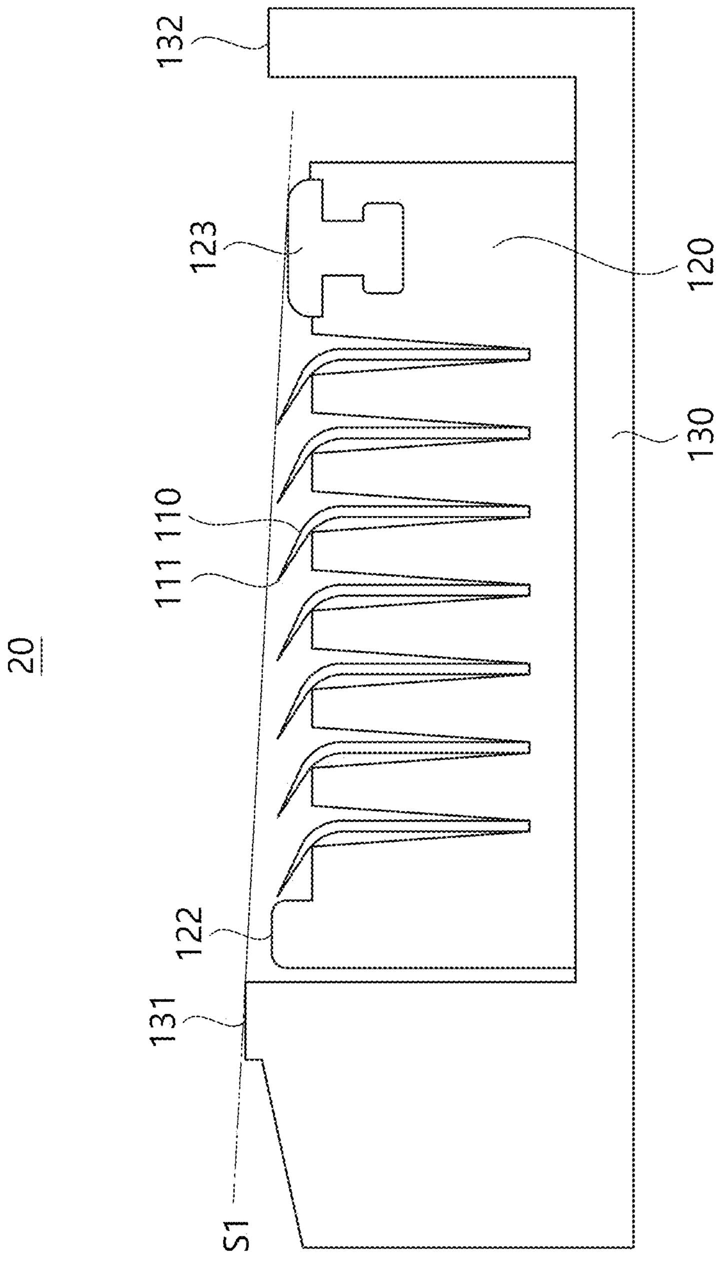
FIG. 6 is a lateral view schematically illustrating that a blade housing of a razor cartridge according to another embodiment of the disclosure is at a foremost position.
Figure 7:
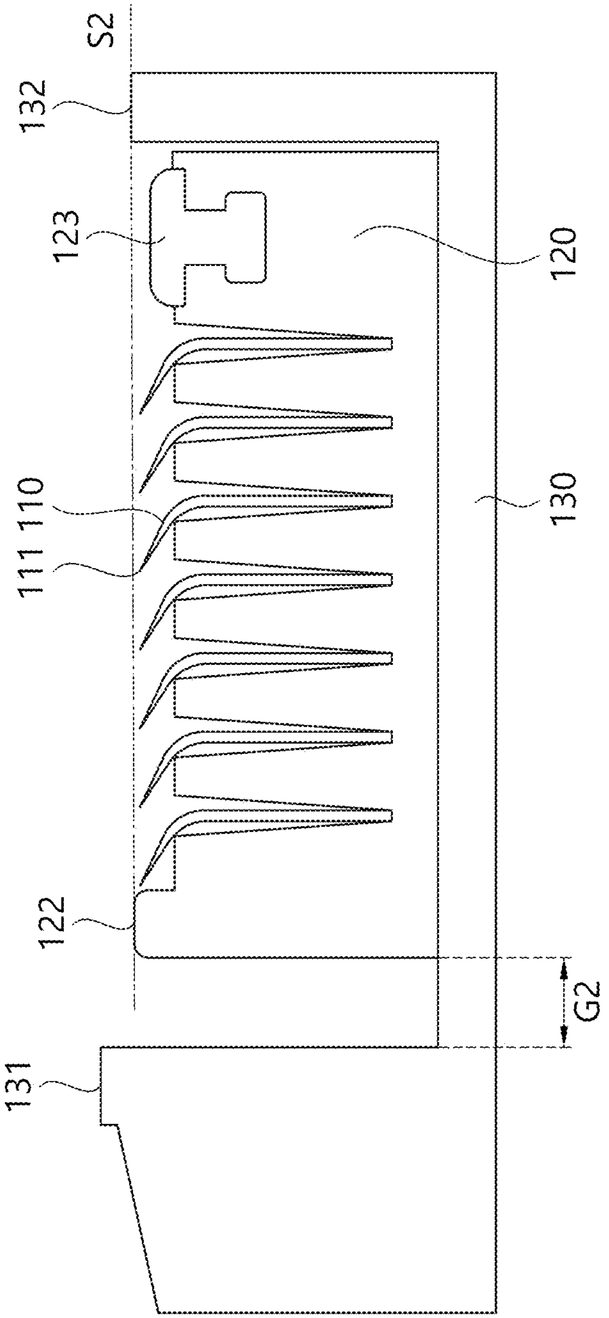
FIG. 7 is a lateral view schematically illustrating that a blade housing of a razor cartridge according to another embodiment of the disclosure is at a rearmost position.

FIG. 5 is a lateral view schematically illustrating a razor cartridge according to another embodiment of the disclosure, FIG. 6 is a lateral view schematically illustrating that a blade housing of a razor cartridge according to another embodiment of the disclosure is at a foremost position, and FIG. 7 is a lateral view schematically illustrating that a blade housing of a razor cartridge according to another embodiment of the disclosure is at a rearmost position.

Referring to FIG. 5, a razor cartridge 20 according to an embodiment of the disclosure includes at least one blade 110, a blade housing 120, and a guard frame 130.

However, unlike the razor cartridge 10 according to the foregoing embodiment, the razor cartridge 20 according to this embodiment includes a second rear supporter 132 formed in the guard frame 130. The rear supporter of the razor cartridge 20 according to this embodiment may include a first rear supporter 123 provided in the blade housing 120, and a second rear supporter 132 provided in the guard frame 130.

The guard frame 130 according to this embodiment further includes the second rear supporter 132 provided in the rear of the blade housing 120. The second rear supporter 132 may protrude upwards higher than the first rear supporter 123. FIGS. 5 to 7 illustrate that the lubrication band serves as the first rear supporter 123. Alternatively, the first rear supporter 123 according to an embodiment may be provided in back of the rearmost blade without including the lubrication band.

Referring to FIG. 6, the shaving plane is defined as the first contact plane S1 that is tangent to both the first front supporter 131 and the rear supporter 123 in the state that the blade housing 120 is at the foremost position relative to the guard frame 130. the razor cartridge 10, like that of the razor cartridge 10 according to the foregoing embodiment.

Referring to FIG. 7, in the razor cartridge 20 according to this embodiment, the second contact surface S2 that is tangent to both the second front supporter 122 and the second rear supporter 132 is defined as the shaving plane in the state that the blade housing 120 is at the rearmost position related to the guard frame 130.

In the razor cartridge 20 according to this embodiment shown in FIG. 7 compared to the razor cartridge 10 according to the foregoing embodiment shown in FIG. 4, the cutting edge 111 has a smaller protrusion value with respect to the second contact plane S2 in the state that the blade housing 120 is at the rearmost relative to the guard frame 130, thereby causing less irritation to skin during the backward movement of the blade 110 than that of the razor cartridge 10 according to the foregoing embodiment.

Figure 8:
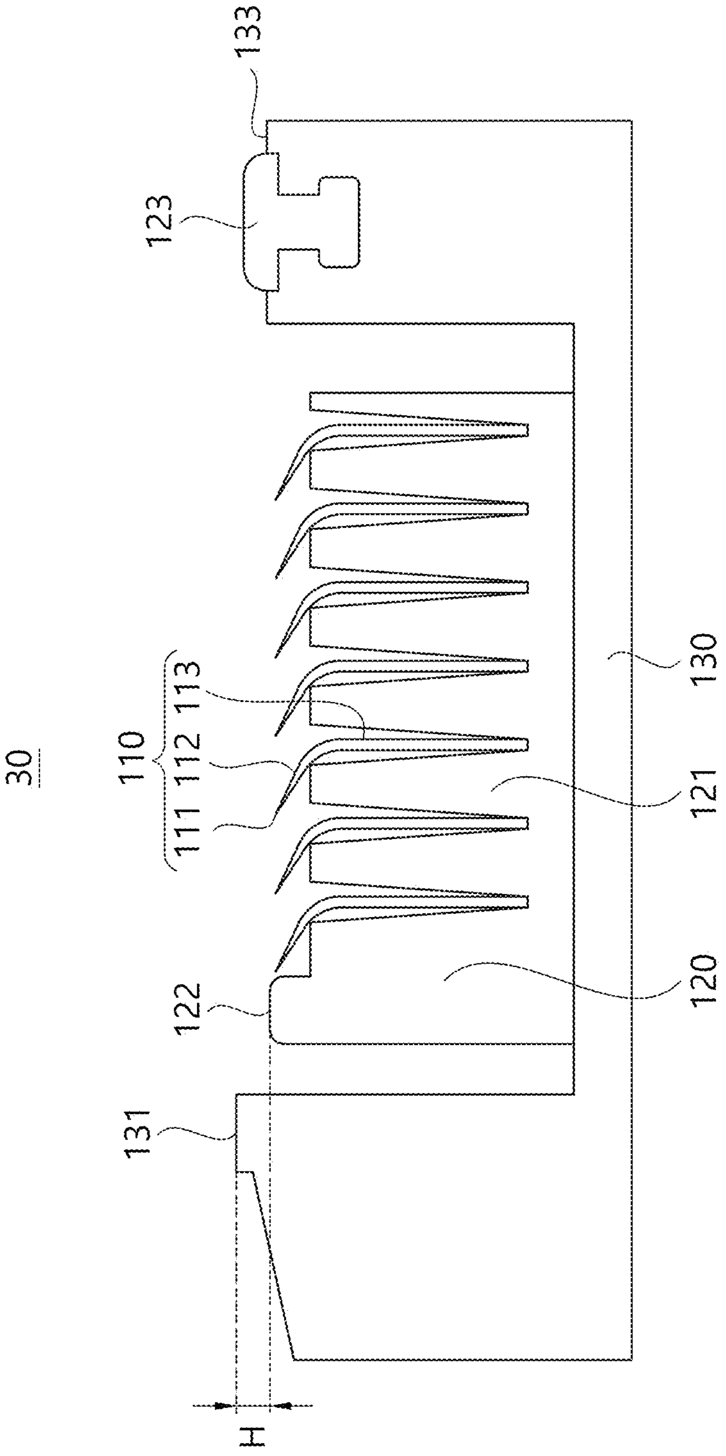
FIG. 8 is a lateral view schematically illustrating a razor cartridge according to still another embodiment of the disclosure.
Figure 9:
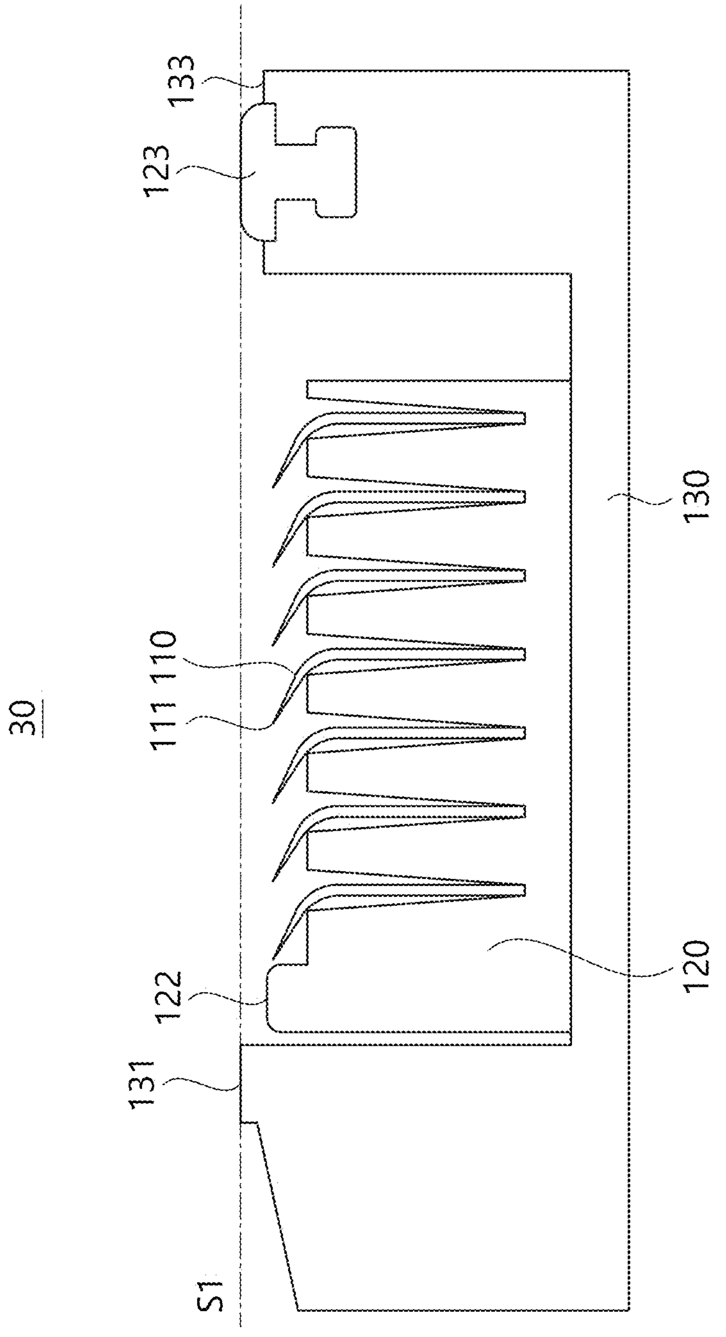
FIG. 9 is a lateral view schematically illustrating that a blade housing of a razor cartridge according to still another embodiment of the disclosure is at a foremost position.

FIG. 8 is a lateral view schematically illustrating a razor cartridge according to still another embodiment of the disclosure, FIG. 9 is a lateral view schematically illustrating that a blade housing of a razor cartridge according to still another embodiment of the disclosure is at a foremost position, and FIG. 4 is a lateral view schematically illustrating that a blade housing of a razor cartridge according to still another embodiment of the disclosure is at a rearmost position.

Referring to FIG. 8, a razor cartridge 30 according to this embodiment of the disclosure includes at least one blade 110, a blade housing 120, and a guard frame 130.

In the razor cartridge 30 according to this embodiment compared to the razor cartridge 10 according to the foregoing embodiment, a rear supporter 133 is formed in the guard frame 130, and the blade housing 120 has no rear supporter. The lubrication band 123 may be provided to be at least partially exposed to the top of the rear supporter 133, and the lubrication band 123 may function as the rear supporter 133 of the guard frame 130. Alternatively, the rear supporter 133 according to an embodiment may include a portion that protrudes upwards higher than the lubrication band 123 in back of the lubrication band 123 or between the lubrication band 123 and the rearmost blade, thereby preventing the lubrication band 123 from functioning as the rear supporter 133. Alternatively, the lubrication band 123 according to an embodiment may not be provided on the rear supporter 133.

Referring to FIG. 9, in the stat that the blade housing 120 is at the foremost position relative to the guard frame 130, the shaving plane is defined as the first contact plane S1 that is tangent to both the first front supporter 131 and the rear supporter 133.

In the razor cartridge 30 according to this embodiment shown in FIG. 9 compared to the razor cartridge 10 according to the foregoing embodiment shown in FIG. 3, the cutting edges of the blades disposed in a relatively rear area have a smaller protrusion value with respect to the first contact plane S1. Therefore, a skin irritation caused during the forward movement of the blade 110 may be less than that of the razor cartridge 10 according to the foregoing embodiment.

Figure 10:
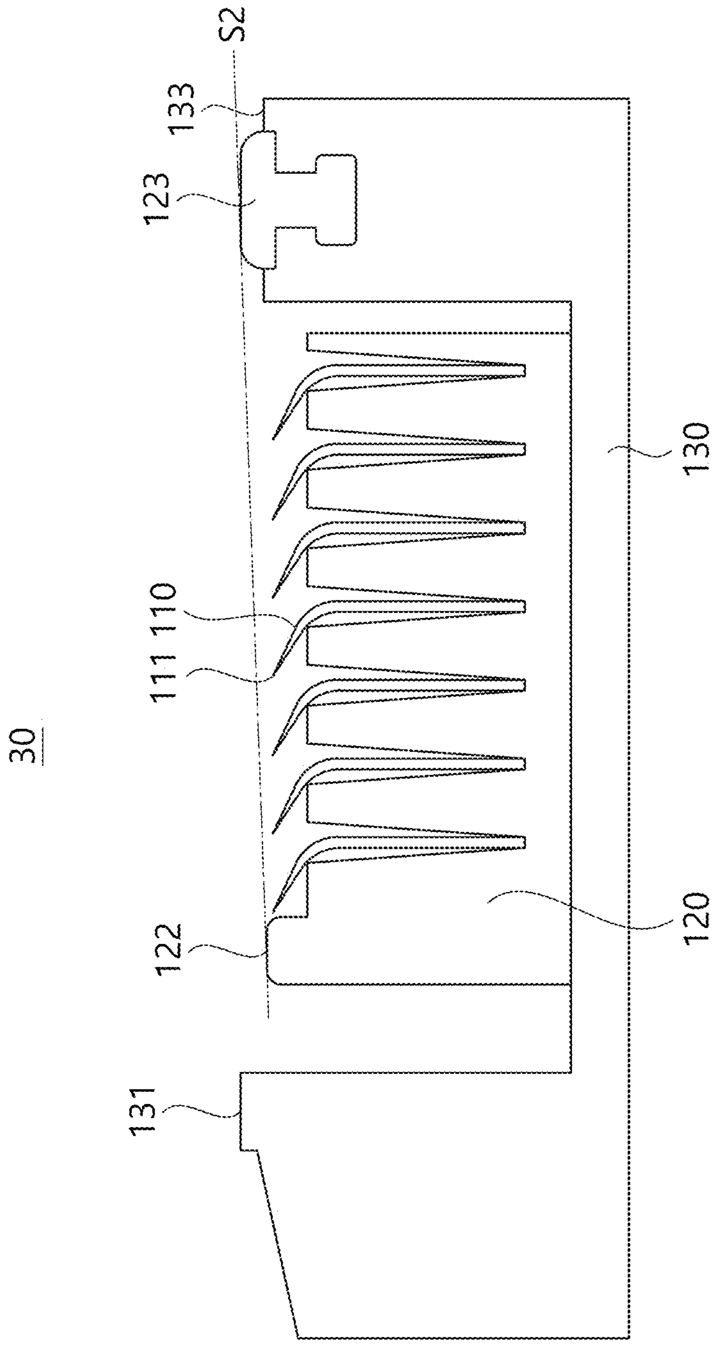
FIG. 10 is a lateral view schematically illustrating that a blade housing of a razor cartridge according to still another embodiment of the disclosure is at a rearmost position.

Referring to FIG. 10, in the state that the blade housing 120 is at the rearmost position relative to the guard frame 130, the second contact plane S2 that is tangent to both the second front supporter 122 and the rear supporter 132 is defined as the shaving plane of the razor cartridge 30 according to this embodiment.

In the razor cartridge 30 according to this embodiment shown in FIG. 10 compared to the razor cartridge 10 according to the foregoing embodiment shown in FIG. 4, the cutting edge 111 has a smaller protrusion value with respect to the second contact plane S2 in the state that the blade housing 120 is at the rearmost position relative to the guard frame 130, thereby reducing a skin irritation caused during the backward movement of the blade 110 to be less than that of the razor cartridge 10 according to the foregoing embodiment.

Referring to FIGS. 3 and 4, a protrusion value P21 of the cutting edge 111*a* with respect to the second contact plane S2 in the state that the blade housing 120 is at the rearmost position relative to the guard frame 130 is greater than a protrusion value P11 of the cutting edge 111*a* with respect to the first contact plane S1 in the state that the blade housing is at the foremost position relative to the guard frame.

Referring to FIGS. 3 and 4, a shaving angle A2 of the cutting edge 111*a* with respect to the second contact plane S2 in the state that the blade housing 120 is at the rearmost position relative to the guard frame 130 is larger than a shaving angle A1 of the cutting edge 111*a* with respect to the first contact plane S1 in the state that the blade housing 120 is at the foremost position relative to the guard frame 130.

Referring to FIG. 3, the shaving angle A1 of the cutting edge 111*a* with respect to the first contact plane S1 ranges from 12.2 degrees to 29 degrees in the state that the blade housing 120 is at the foremost position relative to the guard frame 130.

Referring to FIG. 4, the shaving angle A2 of the cutting edge 111*a* with respect to the second contact plane S2 ranges from 12.6 degrees to 30 degrees in the state that the blade housing 120 is at the rearmost position relative to the guard frame 130.

Referring to FIG. 3, the at least one blade comprises a first blade 110*a* positioned adjacent to the second front supporter 122, and a second blade 110*b* positioned in back of the first blade 110*a*, and a protrusion value P12 of a cutting edge 111*b* of the second blade 110*b* with respect to the first contact plane S1 is greater than a protrusion value P11 of a cutting edge 111*a* of the first blade 110*a* with respect to the first contact plane S1 in the state that the blade housing 120 is at the foremost position relative to the guard frame 130.

Referring to FIG. 4, the at least one blade comprises a first blade 110*a* positioned adjacent to the second front supporter 122, and a protrusion value P22 of a cutting edge 111*b* of the second blade 110*b* with respect to the second contact plane S2 is greater than a protrusion value P21 of a cutting edge 111*a* of the first blade 110*a* with respect to the second contact plane S2 in the state that the blade housing 120 is at the rearmost position relative to the guard frame 130.

Referring to FIGS. 3 and 4, the at least one blade comprises a first blade 110*a* positioned adjacent to the second front supporter 122, and a second blade 110*b* positioned in back of the first blade 110*a*, and a difference in protrusion values P11 and P12 between a cutting edge 111*a* of the first blade 110*a* and a cutting edge 111*b* of the second blade 110*b* with respect to the first contact plane S1 in the state that the blade housing is at the foremost position relative to the guard frame is larger than a difference in protrusion values P21 and P22 between a cutting edge 111*a* of the first blade 110*a* and a cutting edge 111*b* of the second blade 110*b* with respect to the second contact plane S2 in the state that the blade housing 120 is at the rearmost position relative to the guard frame 130.

Referring to FIGS. 3 and 4, a difference in protrusion values P11 and P21 of the cutting edge 111*a* with respect to a shaving plane S1 and S2 between the state that the blade housing 120 is at the foremost position relative to the guard frame 130 and the state that the blade housing 120 is at the rearmost position relative to the guard frame 130 ranges from 66 μm to 154 μm.

Referring to FIGS. 3 and 4, a difference in protrusion values P11 and P21 of the cutting edge 111*a* of the first blade 110*a* with respect to the shaving plane S1 and S2 between the state that the blade housing 120 is at the foremost position relative to the guard frame 130 and the state that the blade housing 120 is at the rearmost position relative to the guard frame 130 ranges from 66 μm to 154 μm, and a difference in protrusion values P12 and P22 of the cutting edge 111*b* of the second blade 110*b* with respect to the shaving plane S1 and S2 between the state that the blade housing 120 is at the foremost position relative to the guard frame 130 and the state that the blade housing 120 is at the rearmost position relative to the guard frame 130 ranges from 58 μm to 135 μm.

Referring to FIGS. 3 and 4, a difference in shaving angles A1 and A2 of the cutting edge 100 with respect to shaving planes S1 and S2 between the state that the blade housing 120 is at the foremost position relative to the guard frame 130 and the state that the blade housing 120 is at the rearmost position relative to the guard frame 130 ranges from 0.45 degrees to 1.05 degrees.

A person having ordinary knowledge in the art to which the disclosure pertains can be understood that the disclosure may be embodied in other specific forms without changing technical spirit or essential features. Accordingly, the embodiments described above are illustrative and not restrictive in all aspects. The scope of the disclosure is defined by the appended claims rather than the foregoing detailed description, and all changes or modifications derived from the meaning and scope of the appended claims and their equivalents are construed as falling within the scope of the disclosure.

What is claimed is:

1. A razor cartridge comprising:

at least one blade having a cutting edge;

a blade housing accommodating the at least one blade in a longitudinal direction; and a guard frame, the blade housing being movable forwards and backwards, the guard frame comprising a first front supporter provided in front of the blade housing and configured to contact skin during a shaving process, the blade housing comprising a second front supporter provided between the at least one blade and the first front supporter and configured to contact skin during the shaving process, and a topmost portion of the first front supporter being higher than a topmost portion of the second front supporter to cause the first front supporter to contact skin in a state that the blade housing is at a foremost position relative to the guard frame, and to cause the second front supporter to contact skin in a state that the blade housing is at a rearmost position relative to the guard frame, during the shaving process, wherein the blade housing or the guard frame further comprises a rear supporter provided in back of the at least one blade and configured to contact skin during the shaving process, wherein a first contact plane that is tangent to the topmost portion of the first front supporter and a topmost portion of the rear supporter is defined as a shaving plane in the state that the blade housing is at the foremost position relative to the guard frame, wherein a second contact plane that is tangent to the topmost portion of the second front supporter and the topmost portion of the rear supporter is defined as the shaving plane in the state that the blade housing is at the rearmost position relative to the guard frame, wherein the second contact plane is non-coplanar with the first contact plane, wherein the at least one blade comprises a plurality of blades, wherein the cutting edges of all of the plurality of blades are disposed entirely below the first contact plane in the state that the blade housing is at the foremost position relative to the guard frame, wherein the cutting edges of all of the plurality of blades are disposed entirely below the second contact plane in the state that the blade housing is at the rearmost position relative to the guard frame, wherein the cutting edges of the blades all face in the same direction, and wherein no blade is present between the first front supporter and the second front supporter.

2. The razor cartridge of claim 1, wherein an angle between the first contact plane and the second contact plane ranges from 0.2 degrees to 1.5 degrees.

3. The razor cartridge of claim 1, wherein a protrusion value of the cutting edge with respect to the second contact plane in the state that the blade housing is at the rearmost position relative to the guard frame is greater than a protrusion value of the cutting edge with respect to the first contact plane in the state that the blade housing is at the foremost position relative to the guard frame.

4. The razor cartridge of claim 3, wherein the cutting edge is positioned below the first contact plane in the state that the blade housing is at the foremost position relative to the guard frame.

5. The razor cartridge of claim 4, wherein the protrusion value of the cutting edge with respect to the first contact plane ranges from −0.21 mm to −0.07 mm in the state that the blade housing is at the foremost position relative to the guard frame.

6. The razor cartridge of claim 3, wherein the protrusion value of the cutting edge with respect to the second contact plane ranges from −0.06 mm to −0.015 mm in the state that the blade housing is at the rearmost position relative to the guard frame.

7. The razor cartridge of claim 1, wherein a shaving angle of the cutting edge with respect to the second contact plane in the state that the blade housing is at the rearmost position relative to the guard frame is larger than a shaving angle of the cutting edge with respect to the first contact plane in the state that the blade housing is at the foremost position relative to the guard frame.

8. The razor cartridge of claim 7, wherein the shaving angle of the cutting edge with respect to the first contact plane ranges from 12.2 degrees to 29 degrees in the state that the blade housing is at the foremost position relative to the guard frame.

9. The razor cartridge of claim 7, wherein the shaving angle of the cutting edge with respect to the second contact plane ranges from 12.6 degrees to 30 degrees in the state that the blade housing is at the rearmost position relative to the guard frame.

10. The razor cartridge of claim 1, wherein:

the plurality of blades comprise a first blade positioned adjacent to the second front supporter, and a second blade positioned in back of the first blade, and a protrusion value of a cutting edge of the second blade with respect to the first contact plane is greater than a protrusion value of a cutting edge of the first blade with respect to the first contact plane in the state that the blade housing is at the foremost position relative to the guard frame.

11. The razor cartridge of claim 10, wherein a protrusion value of a cutting edge of the second blade with respect to the second contact plane is greater than a protrusion value of a cutting edge of the first blade with respect to the second contact plane in the state that the blade housing is at the rearmost position relative to the guard frame.

12. The razor cartridge of claim 1, wherein:

the plurality of blades comprise a first blade positioned adjacent to the second front supporter, and a second blade positioned in back of the first blade, and a difference in a protrusion value between a cutting edge of the first blade and a cutting edge of the second blade with respect to the first contact plane in the state that the blade housing is at the foremost position relative to the guard frame is larger than a difference in a protrusion value between a cutting edge of the first blade and a cutting edge of the second blade with respect to the second contact plane in the state that the blade housing is at the rearmost position relative to the guard frame.

13. The razor cartridge of claim 1, wherein a difference in a protrusion value of the cutting edge with respect to a shaving plane between the state that the blade housing is at the foremost position relative to the guard frame and the state that the blade housing is at the rearmost position relative to the guard frame ranges from 66 μm to 154 μm.

14. The razor cartridge of claim 13, wherein:

the plurality of blades comprise a first blade positioned adjacent to the second front supporter, and a second blade positioned in back of the first blade, a difference in a protrusion value of the cutting edge of the first blade with respect to the shaving plane between the state that the blade housing is at the foremost position relative to the guard frame and the state that the blade housing is at the rearmost position relative to the guard frame ranges from 66 μm to 154 μm, and a difference in a protrusion value of the cutting edge of the second blade with respect to the shaving plane between the state that the blade housing is at the foremost position relative to the guard frame and the state that the blade housing is at the rearmost position relative to the guard frame ranges from 58 μm to 135 μm.

15. The razor cartridge of claim 1, wherein a difference in a shaving angle of the cutting edge with respect to a shaving plane between the state that the blade housing is at the foremost position relative to the guard frame and the state that the blade housing is at the rearmost position relative to the guard frame ranges from 0.45 degrees to 1.05 degrees.

16. The razor cartridge of claim 1, wherein a height difference between a topmost portion of the first front supporter and a topmost portion of the second front supporter ranges from 10 μm to 500 μm.

17. The razor cartridge of claim 1, wherein a gap between the first front supporter and the second front supporter ranges from 0.8 mm to 2.0 mm in a state that the blade housing is at a foremost position relative to the guard frame.

18. The razor cartridge of claim 1, wherein a gap between the first front supporter and the second front supporter ranges from 1.3 mm to 3.1 mm in a state that the blade housing is at a rearmost position relative to the guard frame.

19. The razor cartridge of claim 1, wherein the second contact plane is inclined relative to the first contact plane such that the second contact plane is positioned below the first contact plane in a front region of the razor cartridge and above the first contact plane in a rear region of the razor cartridge.

20. The razor cartridge of claim 1, wherein in the foremost position of the blade housing, a gap G1 between the first front supporter and the second front supporter ranges from 0.8 mm to 2.0 mm, and wherein in the rearmost position of the blade housing, a gap G2 between the first front supporter and the second front supporter ranges from 1.3 mm to 3.1 mm; and G1 is smaller than G2.

21. The razor cartridge of claim 1, wherein the second front supporter is configured to press the skin located in front of a foremost blade to protect the user's skin, and wherein no blade is present between the foremost blade and the second front supporter.

* * * * *